Patented July 26, 1938

2,124,774

UNITED STATES PATENT OFFICE 2,124,774

RUBBER PRODUCT

Lucien Gaisman, Woodley, near Manchester, England

No Drawing. Application January 29, 1936, Serial No. 61,317. In Great Britain and in Ceylon April 29, 1932

12 Claims. (Cl. 106—23)

This invention relates to new rubber compositions in sheeted form, suitable for shipment, which are substantially non-tacky, and which nevertheless contain sufficient oil or other plasticizing agents to adopt the compositions for use in rubber technology in place of reclaimed rubber, to accomplish the same purposes as reclaimed rubber, but in a superior manner, because the compositions produced in accordance with the present invention are not subject to uncertainties in composition, nor do they contain deleterious constituents.

This application is in part a continuation of my prior application, Serial No. 665,740, filed April 12, 1933.

The raw rubber compositions produced according to the present invention are adapted for transportation in creped and sheeted form, and are sufficiently free from tackiness so that objectionable sticking during such transportation does not take place.

It has been customary for a long period of time to use reclaimed rubber, i. e., rubber obtained by treating scrap rubber to free it from admixed foreign material, such as cotton fibres or the like, and subjecting the product to heat and pressure, sometimes with the addition of mineral oil or other oil, in the manufacture of rubber articles. Originally, the reclaimed rubber was used more or less as an adulterant, to lessen the cost of the articles; but even after the price of raw rubber became sufficiently low to make the use of reclaimed rubber unnecessary for this reason, such use continued, because the reclaimed rubber imparted to rubber mixes certain physical properties which are highly desirable. For example, the reclaimed rubber tends to deaden a rubber mix, reducing its resiliency or elasticity so that molded articles produced from a mix containing reclaimed rubber tend to maintain their shape and design. Reclaimed rubber, however, is not a true softener, in the sense that it does not reduce the time or power required for the mastication of raw rubber with which it is mixed.

The use of reclaimed rubber is subject to certain disadvantages, chiefly because of the presence of mineral constituents and sulfur, or because of uncertainties in composition. For example, although scrap rubber, when being converted to reclaimed rubber, ordinarily is treated to remove any free sulfur, combined sulfur is not removed, and the reclaimed rubber has the characteristics, to some extent at least, of vulcanized rubber, rather than those of raw rubber. Also, the last traces of the acid or alkali used to treat the scrap rubber are difficult to remove, and the acid or alkali is usually present to some extent in the reclaimed material. These, although present in but a small amount, have a deleterious effect on rubber, and reduce the quality and life of rubber articles which contain such reclaimed rubber. Also, reclaimed rubber is commonly made from scrap rubber collected through various agencies, and including rubber originally made with a wide variety of ingredients, and it is difficult to produce a reclaimed rubber of constant composition, even though the reclaiming process be constant.

This invention provides as a substitute for reclaimed rubber a raw rubber composition, which, when used in a rubber mix, accomplishes the functions of reclaimed rubber, but is not subject to the disadvantages of reclaimed rubber. The production of this invention is a creped and sheeted raw rubber product, substantially non-tacky, capable of transportation without sticking or undue deterioration, which, when added to a rubber mix serves to reduce the resiliency or elasticity of the mix, and enables the production of molded articles which retain their shape and design. The composition consists essentially of raw rubber, incorporated with regulated amounts of a plasticizing material, such as an oil, wax or resin, and regulated amounts of a pigment, such as carbon black, or zinc or iron oxide, and is of such nature that it can be creped and sheeted. It is advantageously prepared at the plantation, and shipped as a prepared substitute for reclaimed rubber.

According to the present invention, a raw rubber composition which may be advantageously used in place of reclaimed rubber is produced by admixing with raw rubber from 5 to 30% of a plasticizing agent, such as a vegetable or mineral oil, or resin, based on the rubber, and a sufficient amount of pigment, such as carbon black, or zinc or iron oxides, to render the final product non-tacky without overloading the rubber with pigment. Usually from 10 to 30% of pigment is adequate, although more may be added if necessary or desirable. Also, clay or magnesium carbonate may be added to the composition if desired, in adition to the pigment. Other material may also be added, if desired.

The compositions adapted as a substitute for reclaimed rubber produced in accordance with this invention are plastic, soft and readily worked into rubber mixes. They yield rubber articles superior to those obtained when reclaimed rubber is used, because of this freedom from deleterious ingredients and because they contain no vulcanized rubber. Another advantageous feature of these compositions lies in the fact that they can be made to specification, with certain fixed proportions of rubber and other material, and are not subject to fortuitous fluctuations in composition. They can be guaranteed to be free from such ingredients as sulfur, mineral acids or alkali, fibrous material, etc., commonly associated, in varying degrees, with reclaimed rubber. Manufacturers, in using these new compositions in place of reclaimed rubber, will know their exact composition, and will be able to formulate rubber mixes on a calculated basis to produce articles according to specifications.

An advantageous method of producing rubber compositions in accordance with this invention is to mix with raw rubber, while in suspension in water, e. g., as latex, an emulsion of oil or resin in water. The mixture is then coagulated and the solids washed, creped and dried, and sheeted. The pigment may be added to the mixture of rubber suspension and emulsion before coagulation, and precipitated from the resulting suspension simultaneously with the rubber and oil, or it may be added to the coagulated rubber and oil mixture during the creping operation, or after drying. It is not necessary, in forming the rubber-oil suspension to use an emulsion of oil or resin and water, as the oil or resin may be added directly to the rubber suspension or latex, and suspended therein by mechanical agitation.

The invention will be illustrated by the following examples, but it is not limited thereto. The parts are by weight.

*Example 1.*—1 part of boiled linseed oil is emulsified with 2 parts of a 5% potash soap solution, 11¼ parts of the resulting emulsion are added, with vigorous agitation, to 100 parts of latex. The resulting mixture is coagulated by means of dilute acetic acid, and allowed to stand for a period, after which the solids are separated, and washed and creped in the usual manner. The creped sheets are allowed to dry at room temperature. To the dried, creped sheets, 10% by weight of carbon black (gas black) is added on mixing rolls, and thoroughly admixed. The resulting product is sheeted into ½″ sheets, and packed, chalk being sprinkled on the sheets to prevent adhesion.

The product contains approximately 80% rubber, 10% oil, and 10% carbon black. It is similar in appearance and touch to a good black reclaimed rubber, but is superior to reclaimed rubber in the qualities it imparts to manufactured articles in which it is incorporated. The product, in sheeted form, and with a light dusting of chalk or the like, can be shipped from the plantation to the factory without injury and in perfect condition.

The product of Example 1 and a commercial reclaimed rubber were subjected to comparative tests. The reclaimed rubber used had the following specifications:

Specific gravity_____ 1.264
Acetone extract_____ 10.70%
Ash_____ 23.49%
Rubber by difference_____ 65.81%

Articles molded under heat and pressure from the following mixes were compared:

| A | B |
|---|---|
| 21 parts product of Ex. 1. | 25 parts reclaimed rubber as described above. |
| 35 parts smoked rubber sheet. | 35 parts smoked rubber sheet. |
| 10 parts zinc oxide. | 10 parts zinc oxide. |
| 16 parts china clay. | 10 parts china clay. |
| 13 parts carbon black. | 15 parts carbon black. |
| 1½ parts sulfur. | 1½ parts sulfur. |
| 3 parts lime. | 3 parts lime. |
| ¾ part accelerator. | ¾ part accelerator. |

The proportions given are adjusted so that the resulting mixes had approximately the same composition; i. e. enough of the product of Example 1 was used to supply about 16.8 parts of rubber, and enough reclaimed rubber was used to supply about 16.45 parts of rubber. Adjustments were also made in the amount of china clay and carbon black used.

Testing strips 4¾″ x ½″ x ½″, press cured for 25 minutes at 40# steam pressure, were used, and the results calculated per square inch. The following results for breaking strain, elongation, and permanent set were obtained:

| | Breaking strain | Elongation | Permanent set |
|---|---|---|---|
| | *Pounds* | *Percent* | *Percent* |
| A | 2,176 | 787 | 14.4 |
| B | 1,760 | 575 | 13.1 |

Aging tests, carrier out on testing strips of the same dimensions at 70° C. dry, gave the following results:

| | 24 hours aging | | 48 hours aging | |
|---|---|---|---|---|
| | A | B | A | B |
| Breaking strain | 2208 lbs. | 1760 lbs. | 2080 lbs. | 1728 lbs. |
| Elongation | 687% | 550% | 650% | 525% |
| Permanent set | 14.4% | 13.1% | 14.4% | 13.1% |

| | 72 hours aging | | 144 hours aging | |
|---|---|---|---|---|
| | A | B | A | B |
| Breaking strain | 2016 lbs. | 1664 lbs. | 1664 lbs. | 1440 lbs. |
| Elongation | 650% | 525% | 522% | 487% |
| Permanent set | 14.4% | 13.1% | 10.5% | 9.3% |

The following examples illustrate other modifications of the invention, with various proportions of oil and pigment which may be used. In each case the product is obtained finally in sheeted form. The oil which is used may be advantageously added to the latex as an emulsion, or it may be added to the latex and dispersed therein mechanically. The pigments used may be added to the latex, or may be added to the coagulated mixture of latex and oil during creping, or after drying. The products are of various colors, as red, white or black, depending upon the pigment which is used. It is to be understood that the treatment which is used is such as to produce finally a sheeted product, adapted for shipping.

*Example 2.*—266 parts of latex, containing about 100 parts of rubber, are admixed with a quantity of linseed oil emulsion equivalent to 15% of linseed oil based on the rubber. The product is coagulated, and the solids washed, creped and dried. 20% of carbon black, based on the rubber, is added during the creping operation. The product, after drying, is sheeted.

*Example 3.*—To 266 parts of latex, containing about 100 parts of rubber, are added a quantity of linseed oil emulsion equivalent to 10% of linseed oil based on the rubber, 10 parts of carbon black, and 25 parts of clay. The linseed oil, carbon black, and clay are thoroughly dispersed in the latex by agitation. The product is coagulated, washed, creped, dried and sheeted.

*Example 4.*—An emulsion of rape seed oil, containing 10 parts of rape seed oil, is dispersed in 266 parts of latex, containing about 100 parts of rubber. The product is coagulated, and the solids separated, washed and creped. 10 parts of carbon black are added during the creping operation. The product is then dried and sheeted.

*Example 5.*—To 266 parts of latex, containing about 100 parts of rubber, are added a quantity of linseed oil emulsion containing 20 parts of linseed oil, 20 parts of carbon black, and 80 parts of clay during vigorous agitation. The resulting dispersion is treated to coagulate the solids, and the coagulum is separated, washed, creped, dried and sheeted.

*Example 6.*—15 parts of rape seed oil and 20 parts of carbon black are dispersed in 266 parts of latex, containing about 100 parts of rubber. The product is coagulated, and the coagulum treated as in Example 5.

*Example 7.*—To 266 parts of latex, containing about 100 parts of rubber, are added a quantity of rape seed oil emulsion containing 20 parts of rape seed oil, 20 parts of carbon black, and 120 parts of clay. After the added materials are thoroughly dispersed in the latex, the mixture is coagulated, and the solids treated as in Example 5.

*Example 8.*—10 parts of linseed oil are dispersed in 266 parts of latex, containing about 100 parts of rubber. The mixture is coagulated, and the solids separated and washed. The washed solids are then creped, during which 5 parts of red iron oxide are added. The resulting product is dried and sheeted.

*Example 9.*—A sheeted product is produced in a manner similar to that of Example 8, except that 15 parts of linseed oil and 10 parts of red iron oxide are used.

*Example 10.*—To 266 parts of latex, containing about 100 parts of rubber, is added a quantity of linseed oil emulsion containing 20 parts of linseed oil. The mixture is coagulated, and the solids washed, creped, and dried. 10 parts of red iron oxide and 20 parts of clay are then worked into the rubber mix, and the product is sheeted.

*Example 11.*—266 parts of latex, containing 100 parts of rubber, are mixed with a quantity of rape seed oil emulsion containing 20 parts of rape seed oil, and 10 parts of red iron oxide and 30 parts of clay are dispersed in the mixture. The product is coagulated, and the solids treated as in Example 5.

*Example 12.*—An emulsion of paraffin containing 5 parts of paraffin is added to 266 parts of latex, containing about 100 parts of rubber. The mixture is coagulated, and the solids separated and washed. 10 parts of red iron oxide are then added on the creping rolls, and the resulting product is dried and sheeted.

*Example 13.*—10 parts of linseed oil, in the form of an emulsion, are dispersed in 266 parts of latex, containing about 100 parts of rubber, and the mixture is then coagulated. The solids are separated, washed, and creped. During the creping operation 10 parts of zinc oxide and 10 parts of magnesium carbonate are worked into the mixture. The product is dried and sheeted.

*Example 14.*—20 parts of rape seed oil are dispersed in 266 parts of latex. The mixture is coagulated, and the solids separated, washed, and creped. During the creping operation 20 parts of zinc oxide and 40 parts of clay are added. The product is dried and sheeted.

*Example 15.*—To 266 parts of latex, containing about 100 parts of rubber, are added a quantity of paraffin wax emulsion containing 10 parts of paraffin wax, 10 parts of zinc oxide, and 10 parts of clay. After the added material is thoroughly dispersed in the latex, the mixture is coagulated, and the solids treated as in Example 5.

*Example 16.*—10 parts of linseed oil and 5 parts of paraffin are dispersed in 266 parts of latex, containing about 100 parts of rubber. The mixture is coagulated, and the solids are separated and washed. The resulting product is creped, and during this operation 10 parts of zinc oxide and 20 parts of clay are added, after which the product is dried and sheeted.

*Example 17.*—An emulsion containing 10 parts of light mineral oil is mixed with 266 parts of latex, containing about 100 parts of rubber. The mixture is coagulated, and the solids are separated, washed and creped. During the creping operation 10 parts of carbon black are added. The product is then dried and sheeted.

*Example 18.*—15 parts of petroleum jelly and 10 parts of zinc oxide are dispersed in 266 parts of latex, containing about 100 parts of rubber. The resulting mixture is treated as in Example 5.

*Example 19.*—A product is produced as in Example 18, except that 15 parts of gum tragacanth are used instead of the petroleum jelly.

*Example 20.*—To 266 parts of a latex, containing about 100 parts of rubber is added a quantity of gum arabic emulsion containing 10 parts of gum arabic. The mixture is coagulated, and the solids are separated, washed and creped. During the creping operation 10 parts of carbon black are added. The product is then dried and sheeted.

Other oils, waxes or resins may be used in place of those given in the examples. Mixtures of various oils may be used, particularly mixtures of mineral oils or waxes and oleaginous compositions, such as mixtures of linseed oil or rape seed oil and mineral oil or petroleum jelly. The oleaginous materials may be used in saponified form, as soaps rather than as oils. Other pigments and fillers, in addition to, or in place of, those described in the examples, may be used.

An important advantage of the invention, as previously pointed out is that the products may be produced in sheeted form at the plantation, and shipped, without deterioration, to factories, where they may be used in rubber compounding on an assured, scientific basis, in place of reclaimed rubber, to produce rubber mixes of a character highly suitable for molding or the like.

I claim:

1. A non-tacky, sheeted raw rubber product adapted to replace reclaimed rubber in the manufacture of rubber articles comprising a mixture of raw rubber and an oleaginous plasticizing agent, the amount of said plasticizing agent being between 5 and 30% based on the rubber and sufficient to render the product tacky in the absence of a pigment, and sufficient pigment to render the product substantially non-tacky, and suitable for shipment in sheeted form.

2. A non-tacky, sheeted raw rubber product adapted to replace reclaimed rubber in the manufacture of rubber articles comprising the coagulum of latex and an oleaginous plasticizing agent, the amount of such plasticizing agent being between 5 and 30% based on the rubber and sufficient to render the product tacky in the absence of a pigment, admixed with sufficient pigment to render the product substantially non-tacky, and suitable for shipment in sheeted form.

3. A product as in claim 1, in which the plasticizing agent is a mineral oil.

4. A product as in claim 1, in which the plasticizing agent is linseed oil.

5. A product as in claim 1, in which the plasticizing agent is vegetable oil.

6. A product as in claim 1, in which the plasticizing agent is drying oil.

7. A product as in claim 1, in which the pigment is present in an amount between 10 and 30% based on the rubber.

8. A product as in claim 1, in which, in addition to the plasticizing agent and pigment, a filler is included.

9. The process of producing a sheeted raw rubber composition adapted to replace reclaimed rubber in rubber technology which comprises dispersing in latex an amount of an oleaginous plasticizing agent ranging from 5 to 30%, based on the rubber, coagulating the mixture, separating and washing the solids, creping the resulting product with admixture of sufficient pigment to render the final product non-tacky, and drying and sheeting said product.

10. The process of producing a sheeted raw rubber composition adapted to replace reclaimed rubber in rubber technology which comprises dispersing in latex an amount of an oleaginous plasticizing agent ranging from 5 to 30% and from 10 to 30% of pigment based on the rubber, coagulating the mixture, separating and washing the solids, and creping, drying and sheeting the resulting product.

11. A raw rubber composition adapted to replace reclaim rubber in the manufacture of rubber articles comprising the coagulum of an emulsion containing about 100 parts of latex and about 5 parts of linseed oil, admixed with about 10 parts of carbon black.

12. The process of compounding rubber which comprises coagulating a dispersion containing about 100 parts of latex and about 4 parts of linseed oil, milling about 10 parts of carbon black into the resulting coagulum, and sheeting the product.

LUCIEN GAISMAN.